United States Patent
Lund et al.

(10) Patent No.: US 7,519,057 B2
(45) Date of Patent: Apr. 14, 2009

(54) SYSTEM AND METHOD FOR COMMUNICATING USING A MULTISERVER PLATFORM

(75) Inventors: Martin Lund, Menlo Park, CA (US); Gregory Young, Laguna Niguel, CA (US)

(73) Assignee: Broadcom Corporation, Irvine, CA (US)

( * ) Notice: Subject to any disclaimer, the term of this patent is extended or adjusted under 35 U.S.C. 154(b) by 920 days.

(21) Appl. No.: 10/647,962

(22) Filed: Aug. 26, 2003

(65) Prior Publication Data
US 2004/0160900 A1 Aug. 19, 2004

Related U.S. Application Data (60) Provisional application No. 60/448,656, filed on Feb. 18, 2003, provisional application No. 60/456,831, filed on Mar. 21, 2003, provisional application No. 60/458,719, filed on Mar. 28, 2003, provisional application No. 60/463,014, filed on Apr. 15, 2003.

(51) Int. Cl.
*H04L 12/28* (2006.01)
*G06F 15/16* (2006.01)
*G06F 3/00* (2006.01)

(52) U.S. Cl. .............. 370/389; 370/400; 370/398; 709/219; 709/233; 710/60

(58) Field of Classification Search ........... 370/390, 370/398, 389, 391, 364, 468, 395.41, 451, 370/465, 466; 710/316, 305, 2; 709/203, 709/227, 208, 223, 209; 361/686, 788, 796
See application file for complete search history.

(56) References Cited

U.S. PATENT DOCUMENTS

| | | | |
|---|---|---|---|
| 6,904,482 B2 * | 6/2005 | Rietze et al. | 710/107 |
| 6,931,475 B2 * | 8/2005 | Huang et al. | 710/316 |
| 6,950,895 B2 * | 9/2005 | Bottom | 710/301 |
| 7,003,563 B2 * | 2/2006 | Leigh et al. | 709/223 |
| 7,032,037 B2 * | 4/2006 | Garnett et al. | 710/2 |
| 7,124,163 B2 * | 10/2006 | Geofroy et al. | 709/203 |
| 7,174,375 B2 * | 2/2007 | King et al. | 709/223 |
| 7,188,209 B2 * | 3/2007 | Pettey et al. | 710/316 |
| 7,339,786 B2 * | 3/2008 | Bottom et al. | 361/686 |
| 2002/0124114 A1 | 9/2002 | Bottom et al. | |

* cited by examiner

*Primary Examiner*—Hanh Nguyen
(74) *Attorney, Agent, or Firm*—McAndrews, Held & Malloy, Ltd.

(57) ABSTRACT

Aspects of the invention include receiving a first packet from a first of a plurality of blade servers at a first data rate and determining a second blade server that may receive the first packet. Data responsive to the received first packet may be transferred to the second blade server at a negotiated first data rate. A second packet comprising at least a portion of the first received packet may be transferred to the second blade server at the negotiated data rate. At least a portion of the first received packet may be transferred to at least the second blade server via a common bus. In another aspect of the invention, at least a third packet may be received from a network at a second data rate. Data responsive to the third packet may be transferred to at least a third blade server at a newly negotiated data rate.

30 Claims, 4 Drawing Sheets

SYSTEM AND METHOD FOR COMMUNICATING USING A MULTISERVER PLATFORM

CROSS-REFERENCE TO RELATED APPLICATIONS/INCORPORATION BY REFERENCE

This application makes reference to, and/or claims priority to and/or claims benefit to:

U.S. Provisional Patent Application Ser. No. 60/448,656, entitled "A Method and System to Provide External Communication Using a Multi-Server Platform Having a Single Switch Backplane" and filed on Feb. 18, 2003;

U.S. Provisional Patent Application Ser. No. 60/456,831, entitled "Method and System to Provide Inter-Blade Server Communication Using a Single Switch Backplane" and filed on Mar. 21, 2003;

U.S. Provisional Patent Application Ser. No. 60/458,719, entitled "Method and System to Provide Inter-Chassis Blade Server Integration for Scalability" and filed on Mar. 28, 2003; and U.S. Provisional Patent Application Ser. No. 60/463,014, entitled "Method and System to Selectively Steer Data Traffic to Service Blades Using a Single Switch Backplane" and filed on Apr. 15, 2003.

The above stated applications are hereby incorporated herein by reference in their entirety.

FIELD OF THE INVENTION

Certain embodiments of the invention relate to communication among servers. More specifically, certain embodiments of the invention relate to a method and system for communicating using a multiserver platform.

BACKGROUND OF THE INVENTION

A server may be a computer system in a network that may be accessed by one or more users and/or other computers. The server may provide, for example, access to information such as files, and to services such as communications, printing or other types of services that may be available through a network. In some cases, a special network operating system (OS) may run on a dedicated server, for example, in a large network. A personal computer (PC) operating system may run on a non-dedicated server having, for example, peer-to-peer networking software running thereon.

Generally, a server may have one or more advanced or more powerful central processing units (CPUs), a larger memory, a larger cache and more storage space than a typical single user workstation or personal computer. The server may include, for example, multiple processors which may be dedicated to a particular service or provide a particular function such as e-mail handling, printing or communications. The server may also include devices such as, large power supplies, backup power capabilities such as an uninterruptible power supply (UPS) and various fault tolerant or redundant features such as redundant array of independent disks (RAID) technologies.

A single server may exist in a standalone enclosure and may interface with a network via one or more network interfaces. Multiple standalone boxes may be situated in a central computing center with each standalone box coupled to a network via a respective cable. Each server may interface to the network separately at a particular data rate such as, for example, approximately 1 gigabits/second (Gb/s) for a Gigabit Ethernet or approximately 10 Gb/s for a 10 Gigabit Ethernet.

Thus, the single server in a standalone enclosure may inefficiently utilize large amounts of space and/or power. Furthermore, since each single server may be connected to the network directly via a respective cable, a room full of servers might be overflowing with cables possibly necessitating detailed cable maps which may be quite time-intensive and costly to produce. In addition, single servers in a standalone enclosure may not be easily replaced during failure, particularly when there may be multiple failures. Consequently, the conventional single server in a standalone box may ultimately suffer from a substantial total cost of ownership (TCO).

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

Certain embodiments of the invention provide a method and system for communicating information in a server platform. Aspects of the method for communicating information in a server platform may include receiving at least a first packet from a first blade server of a plurality of blade servers at a first data rate. A determination may be made as to which of at least a second blade server should receive the first packet and/or whether the received packet should be sent to a network. Accordingly, data responsive to the received first packet may be transferred to the second blade server at a negotiated data rate. The received packet may also be transferred to the network at a second data rate. A second packet comprising at least a portion of the first received packet may be transferred to the second blade server at the negotiated data rate. In this regard, at least a portion of the first received packet may be transferred to at least the second blade server via a common bus. At least a third packet may be received from the network at a second data rate.

The method may also include the step of determining which of at least a third blade server is to receive the third packet. Data responsive to the third packet may be transferred to the third blade server at a newly negotiated data rate which may include the previously negotiated data rate. At least a portion of the third packet may be transferred to the third blade server at a newly negotiated data rate which may include any previously negotiated data rate. A fourth packet may be transferred over the network via a network interface at the second data rate. In another aspect of the invention, a plurality of packets may be broadcasted over the network at the second data rate. Also, the first packet may be broadcasted to at least the first blade server and the second blade server at a newly negotiated data rate which may include any previously negotiated data rate.

Another embodiment of the invention may provide a machine-readable storage, having stored thereon, a computer program having at least one code section for communicating information in a server platform. The at least one code section may be executable by a machine, thereby causing the machine to perform the steps as described above for communicating information in a server platform.

Aspects of the system for communicating information in a server platform may include at least one switch blade that receives at least a first packet from a first blade server of a plurality of blade servers at a first data rate. The switch blade may determine which of at least a second blade server should receive the first packet and/or whether the received packet should be sent to a network. Accordingly, data responsive to the received first packet may be transferred by the switch blade to the second blade server at a negotiated data rate data rate. The received packet may also be transferred by the switch blade to the network at a second data rate. A second packet comprising at least a portion of the first received packet may be transferred by the switch blade to the second blade server at the negotiated data rate. In this regard, at least a portion of the first received packet may be transferred by the switch blade to at least the second blade server via a common bus. The switch blade may also receive at least a third packet from the network at a second data rate.

The switch blade may also have the capability to determine which of at least a third blade server is to receive the third packet. Data responsive to the third packet may be transferred by the switch blade to the third blade server at a newly negotiated data rate which may include the previously negotiated data rate. At least a portion of the third packet may be transferred by the switch blade to the third blade server at a newly negotiated data rate which may include any previously negotiated data rate. A fourth packet may be transferred by the switch blade over the network via a network interface at the second data rate. In another aspect of the invention, a plurality of packets may be broadcasted by the switch blade over the network at the second data rate. Also, the first packet may be broadcasted by the switch blade to at least the first blade server and the second blade server at a newly negotiated data rate which may include any previously negotiated data rate.

These and other advantages, aspects and novel features of the present invention, as well as details of an illustrated embodiment thereof, will be more fully understood from the following description and drawings.

DETAILED DESCRIPTION OF THE INVENTION

Certain embodiments of the invention provide a method and system for communicating information in a server platform. Aspects of the method may include receiving a first packet from a first of a plurality of blade servers at a first data rate. A determination may be made regarding at least a second blade server that should receive the first packet. A data rate at which the first packet may be sent may also be negotiated. Accordingly, as at least part of a response to the received first packet, data may be transferred to the second blade server at the negotiated data rate. A determination may also be made as to whether data responsive to the first packet should be sent to a network. In this case, responsive data may be sent to the network at a predefined rate or at a negotiated rate.

In accordance with an aspect of the invention, a second packet comprising at least a portion of the first received packet may be transferred to the second blade server at a negotiated data rate which may be similar to a previously negotiated data rate. In this regard, at least a portion of the first received packet may be transferred to at least the second blade server via a common bus. In another aspect of the invention, at least a third packet may be received from a network at a second data rate.

The method may also include the step of determining which of at least a third blade server should receive the third packet. Data responsive to the third packet and/or at least a portion of the third packet may be transferred to the third blade server at the newly negotiated data rate which may be similar to a previously negotiated data rate. Additionally, a fourth packet may also be transferred over the network via a network interface at the second data rate. In another aspect of the invention, a plurality of packets may be broadcasted over the network at the second data rate. Also, the first packet may be broadcasted to at least the first blade server and the second blade server at a newly negotiated data rate that may be similar to any previously negotiated data rate.

Figure 1:
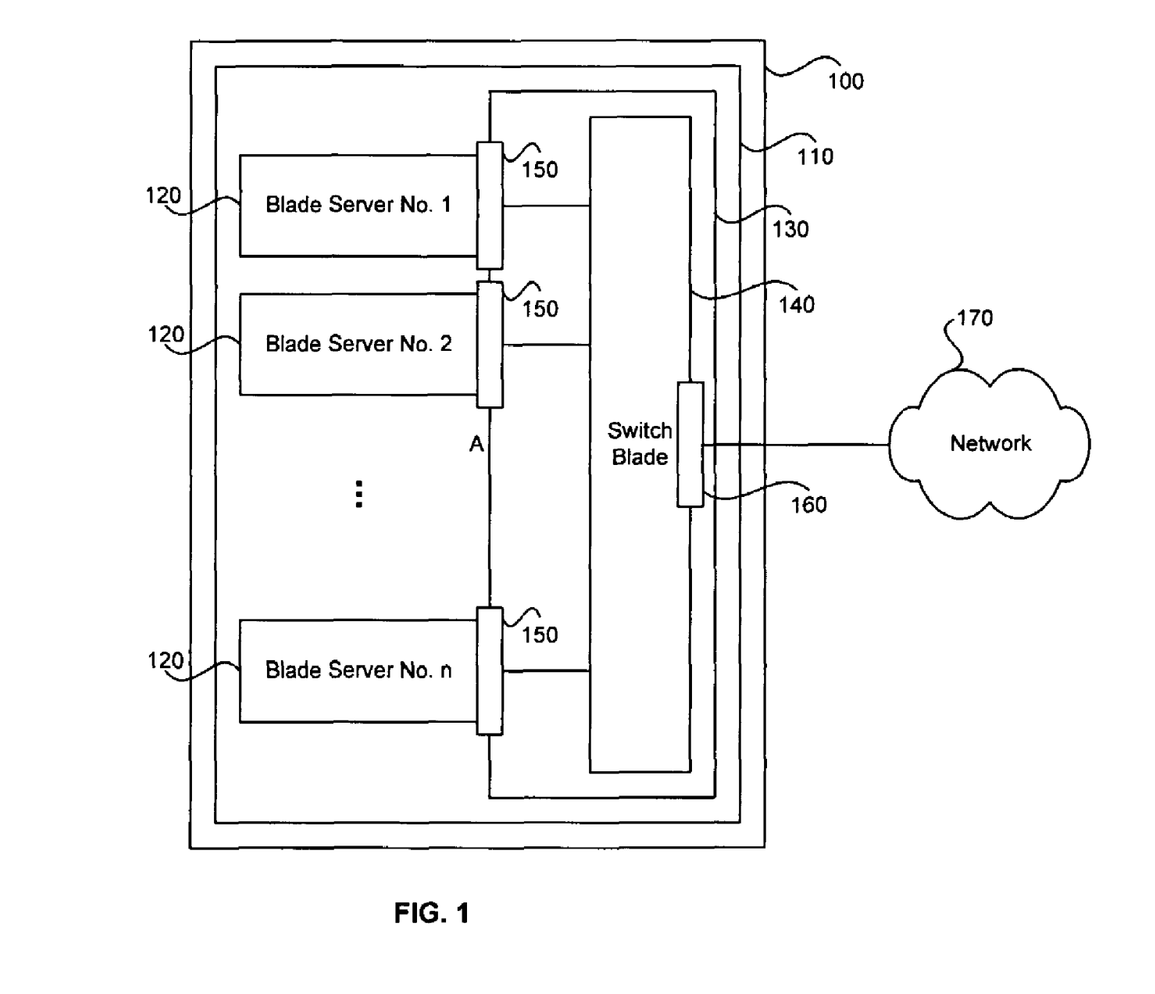
FIG. 1 is a block diagram of an embodiment of a multiserver platform in accordance with an embodiment of the present invention.

FIG. 1 is a block diagram of an embodiment of a multiserver platform 100 in accordance with an embodiment of the present invention. The multiserver platform 100 may include a chassis 110, a backplane 130, a switch blade 140, blade server interfaces 150, and a plurality of blade servers No. 1, No. 2, . . . , No. n, collectively referenced as 120.

The chassis 110 may include the backplane 130. However, although only one backplane 130 is shown, the invention is not so limited and a plurality of backplanes may be provided within the chassis 110. In this regard, one or more backplanes may be coupled together. In a case where the chassis 110 may include a single backplane, the backplane may be regarded as a common backplane, which may provide connectivity for the blade servers 120. The chassis 110 may be part of a single installation enclosure that includes a plurality of blade server slots which may be adapted for receiving one or more of the blade servers 120.

The backplane 130 may include, for example, one or more blade server interfaces collectively referenced as 150, which may be referred to as blade server interconnects. In this regard, the chassis 110 may include a plurality of blade server slots that may be adapted to facilitate connection between the blade servers and the blade server interfaces 150. In other words, the blade server slots may provide a conduit for coupling the blade servers 120 to the blade server interfaces 150. The backplane 130 may also include one or more interfaces such as a network interface 160. The network interface 160 may be referred to as a network interconnect.

The switch blade 140 may be part of the backplane 130. In this regard, the switch blade 140 may be integrated within the backplane 130 or it may be a plug-in card that may be plugged into the backplane 130.

The blade servers 120 may be coupled to the backplane 130 via the blade server interfaces 150. Each of the blade servers 120 may therefore be coupled to a corresponding one of the server interfaces 150. For example, each of the blade servers 120 may be plugged into or removably mounted in a corresponding blade server slot in the chassis 110 so that it interfaces with a corresponding one of the server interfaces. In this regard, the blade servers 120 may be coupled to the backplane 130.

Once the blade servers 120 are mounted or plugged into the chassis 110, the blade servers 120 may be coupled to the switch blade 140 of the backplane 130 via the blade server interfaces 150. The backplane 130 may be adapted to provide connectivity, for example, between two or more of the blade servers 120. Furthermore, the backplane 130 and/or the switch blades 140 may provide connectivity between the one or more of the blade servers 120 and the network 170.

The network interface 160 facilitates connectivity between the backplane 130 and the network 170. In this regard, the network interface 160 may couple backplane 130 and/or one or more of the plurality of switch blades 140 to the network 170.

Figure 2:
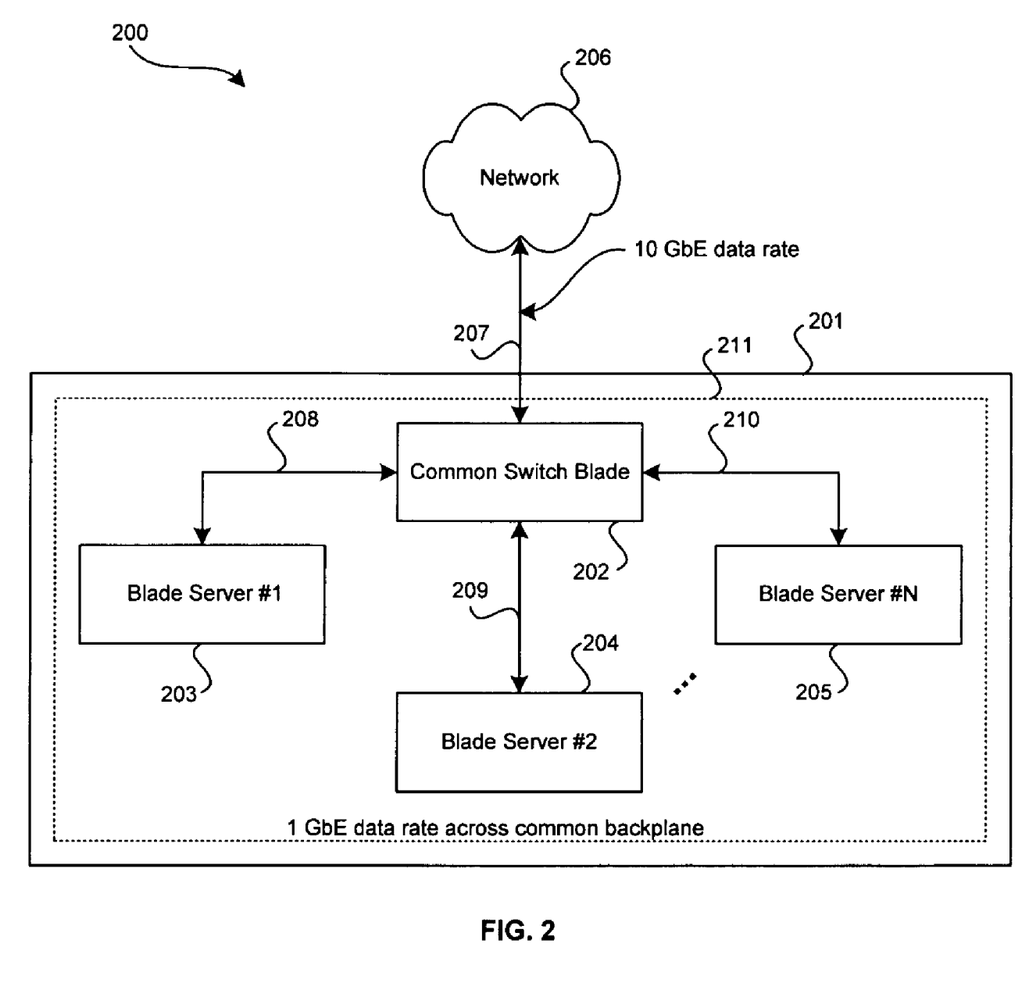
FIG. 2 is a block diagram illustrating an embodiment of a communication system including a multiserver platform in accordance with various aspects of the invention.

FIG. 2 is a block diagram illustrating an embodiment of a communication system 200 including a multiserver platform in accordance with various aspects of the invention. The multiserver platform 201 may include a chassis having a common backplane 211, a common switch-blade 202 and a plurality of blade servers including, a blade server #1 203, a blade server #2 204, . . . , blade server #N 205, where N may be any integer number.

Each of the blade servers #1, #2, . . . , #N may be a server that has been integrated on a single plug-in card or blade that may be plugged into a blade server slot of the chassis with the common backplane 211. The chassis with a common backplane 211 may provide a single installation enclosure for the multiple blade servers #1, #2, . . . , #N.

The chassis with the common backplane 211 may also serve a common interface between each blade server 203, 204, 205 and the common switch blade 202. For example, common backplane 211 may provide a common backplane interface 208 between blade server #1 203 and the common switch blade 202. Common backplane 211 may also provide a common backplane interface 209 between blade server #2 204 and the common switch blade 202. Finally, common backplane 211 may provide a common backplane interface 210 between blade server #N 205 and the common switch blade 202. In this regard, the common backplane interfaces 208, 209, 210 are part of the common backplane 211.

The common switch blade 202 may include N+1 interfaces and at least a portion of these interfaces may be adapted to perform packet switching of data frames between the N blade servers and the external network 206, in accordance with an embodiment of the invention. The common switch-blade may include intelligence that may manage and distribute data traffic to the relevant blade servers including blade server #1, #2, . . . , #N. The common switch-blade 202 may interface with each of the N blade servers via the common backplane 211. The common switch-blade 202 may also interface with the external network 206, thereby resulting in N+1 interfaces.

In accordance with an embodiment of the invention, the external network 206 may include a 10 Gigabit Ethernet network connection and interface. The external interface 207 between the common switch blade 202 and the external network 206 may include a 10 Gigabit Ethernet (GbE) interface, operating at a data rate of 10 Gb/s. In this regard bi-directional network communication capability may be provided between the external network 206 and the common switch blade 202. In order to facilitate Gigabit Ethernet communication, the common backplane 211 may include a plurality of Gigabit Ethernet (GbE) interfaces. The switch blade 202 may communicate with each of the N blade servers independently over the common backplane 211 at a data rate of 1 Gb/s. For example, the blade server #1 203 may communicate in a bi-directional manner with the common switch-blade 202 via the common backplane interface 208. The blade server #2 204 may also communicate in a bi-directional manner with the common switch blade 202 via the common backplane interface 209. Finally, the blade server #N 105 may communicate in a bi-directional manner with the common switch blade 202 via the common backplane interface 210.

In accordance with an embodiment of the present invention, the common switch blade 202 may have the capability to handle communication with the multiple blade servers 203, 204, 205 at the same time. In this regard, the common blade server 202 may facilitate the simultaneous transfer of information between any of the blade servers 203, 204, 205.

In an aspect of the invention, at least one of the blade servers may be configured to provide a switching function. Accordingly, the blade server that is configured to provide the switching function may be referred to as a switch blade. The common switch blade, which may also be referred to as switch blade, may include suitable hardware and/or software that may be utilized to switch packets and/or connections between two or more blade servers wishing to communicate. The blade server may therefore have the capability to function as a softswitch and/or a hardware switch. In any case, the switch blade and the other blade servers may be coupled to at least one backplane so that signals associated with each of the blade servers may be accessible by the switch blade, the latter of which is also coupled to the backplane. The backplane may therefore be referred to as a common backplane.

Figure 3:
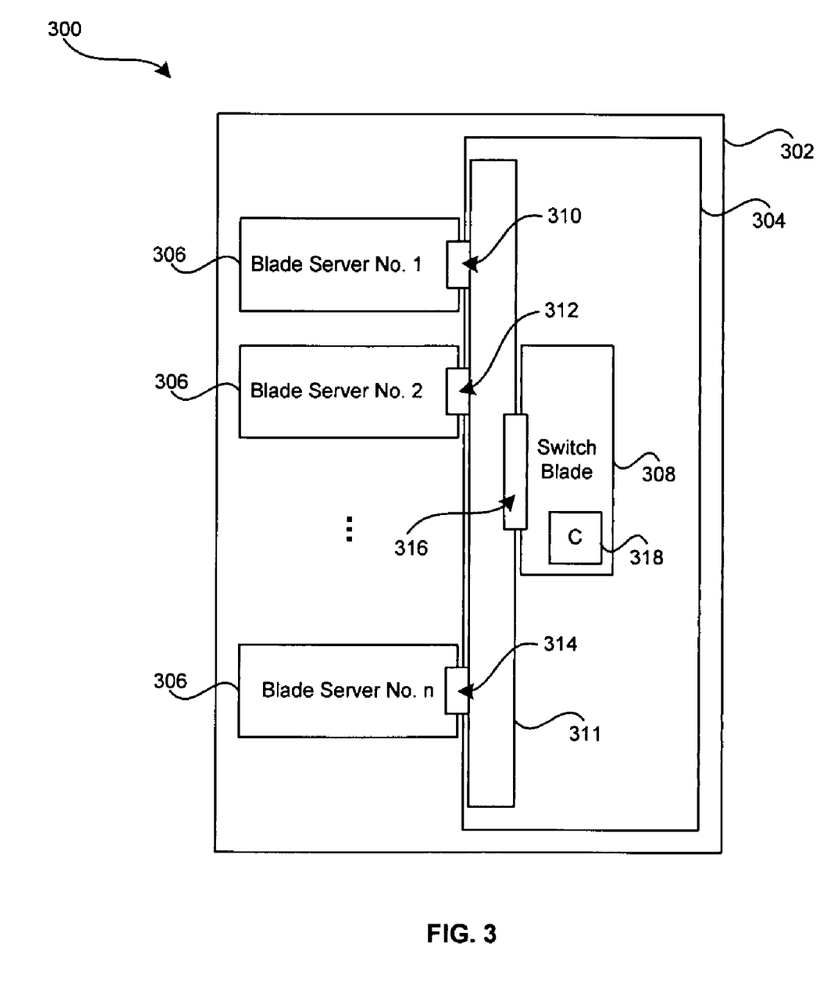
FIG. 3 is a block diagram illustrating a common backplane for interconnecting a plurality of blade servers in accordance with an embodiment of the invention.

FIG. 3 is a block diagram illustrating a common backplane for interconnecting a plurality of blade servers in accordance with an embodiment of the invention. Referring to FIG. 3, there is shown an enclosure or chassis 302, a backplane 304, a plurality of n blade servers collectively referred to as 306, a switch blade 308 and a bus 311. Also shown are bus transceivers 310, 312, 314, 316 and a controller 318. Each of the bus transceivers 310, 312, 314, 316 may include at least one transmitter that may transmit electrical signals onto the bus 311 within the backplane 304. Each of the bus transceivers 310, 312, 314, 316 may also include at least one receiver that may receive electrical signals onto the bus 311 within the backplane 304. The bus 311 may be a time division multiplexed (TDM) bus, a frequency division multiplexed (FDM) bus, or any other suitable type of bus. Accordingly, the bus transceivers 310, 312, 314, 316 may be suitable time division multiplexed bus transceivers and/or frequency division multiplexed bus transceivers, for example.

Each of the blade servers 306 and the switch blade 308 may include a bus transceiver that may be coupled to the bus 311. In this regard, blade server No. 1 includes a bus transceiver 310, blade server No. 2 includes a bus transceiver 312, and blade server No. n includes a bus transceiver 314. The switch blade 308 may also include a bus transceiver 316 and a bus controller 318. Although the bus controller 318 is illustrated as a separate entity within the switch blade 308, the invention is not so limited. Accordingly, one or more functions provided by the bus controller 318 may be provided by the switch blade 308. In a case where all of the functions offered by the bus controller may be provided by the switch blade, this may eliminate a need for an additional bus processing entity such as the bus controller 318.

Notwithstanding, the bus controller 318 and/or the switch blade 308 may be adapted to control the transfer of messages between the blade servers 306 and the switch blade 308. In this regard, the bus controller 318 may handle functions such as bus access and bus arbitration. The bus controller 318 and/or the switch blade 308 may also provide a switching function that may permit messages to be transferred among the blade servers 306 via the switch blade and from an external source such as the network 170 (FIG. 1) to any one or more of the blade servers 306. For example, one or more messages received from the network 170 may be steered by the switch blade 308 to one or more of the blade servers 306 based on a message type and a function provided by one or more of the blade servers 306. U.S. patent application Ser. No. 10/648, 573 filed Aug. 26, 2003, discloses a method and system for selective steering of data traffic of various data types to functionally dedicated blade servers which application is incorporated herein by reference in its entirety.

The bus controller 318 and/or the switch blade 308 may include suitable hardware and/or software that may be adapted to control, for example, bus access, bus arbitration and/or switching among the blade servers 306 and the switch blade 308. The hardware and/or software may therefore control the manner in which messages may be received from a first blade server and transferred, routed or switched to a second blade server via the switch blade 308.

Figure 4:
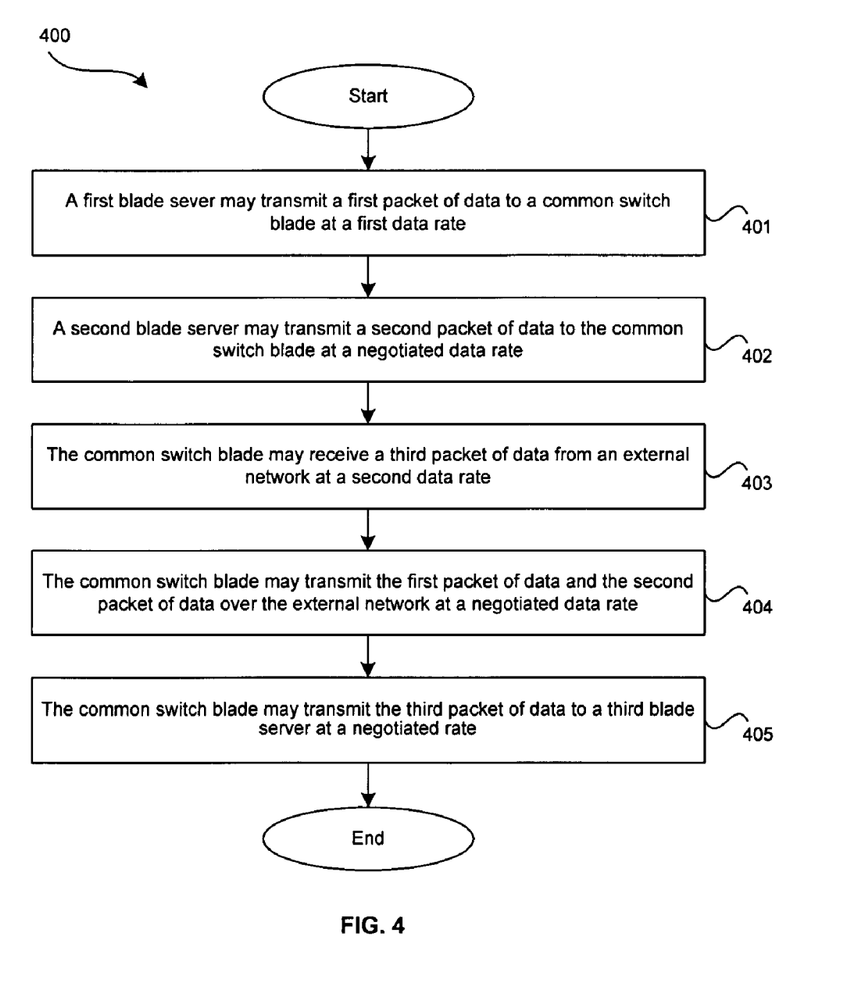
FIG. 4 is a flowchart illustrating exemplary steps for providing external communication using the multiserver platform of FIG. 1 in accordance with an embodiment of the invention.

FIG. 4 is a flowchart 400 illustrating exemplary steps for providing external communication using the multiserver platform of FIG. 1 in accordance with an embodiment of the invention. Referring to FIG. 4, in step 401, a first blade server may transmit a first packet of data to a common switch blade at a first data rate. In step 402, a second blade server may transmit a second packet of data to the common switch blade at a negotiated data rate. In step 403, the common switchblade may receive a third packet of data from an external network at a second data rate. In step 404, the common switch blade may transmit the first packet of data and the second packet of data over the external network at a negotiated data rate. In step 405, the common switch blade may transmit the third packet of data to a third blade server at a negotiated data rate. Although the exemplary steps are described in a particular order, the invention is not so limited. Accordingly, the exemplary steps may be performed in a different order or some of the steps may be performed concurrently without departing from the various aspects of the invention. For example, according to some embodiments of the invention, step 401 and step 402 may be performed concurrently or step 402 and step 403 may be performed concurrently. In another example, step 403 may be performed before step 402 and step 402 may be performed before step 401.

In accordance with an embodiment of the invention, the second data rate may be higher than the first data rate. For example, the first data rate may be 1 gigabit per second and the second data rate may be 10 gigabits per second. In this regard, 1 gigabit Ethernet (GbE) or 10 GbE may be utilized. As a result, the switch blade 140 of FIG. 1 may have the capability to handle communication with any of the plurality of blade servers 120 at the first data rate and communication with the external network 170 at the second data rate. Notwithstanding, the first data rate and the second data rate may, however, be any combination of data rates where the second data rate is higher than the first data rate.

In accordance with an embodiment of the invention, data rates may be negotiated to increase performance and provide more efficient bandwidth utilization, for example. Accordingly, negotiated data rates may result from negotiation between any combination of switch blades and blade servers. In this regard, a blade server and another blade server may negotiate a data rate and a blade server and a switch blade may negotiate a data rate. Additionally, a switch blade may negotiate a data rate with another switch blade and a switch blade may negotiate a data rate with a network component or entity. During negotiation of data rates by any of the blade servers and/or switch blade, a negotiated data rate may be selected that may be similar or different from a previously utilized data rate.

The integration of multiple blade servers into a multiserver platform 100 (FIG. 1) may provide an increased server density and an easier management of the multiple servers since all the servers are situated in a single installation enclosure. Additionally, the integration of multiple blade servers may provide a more scalable system with greater reliability. With regard to scalability, more servers may be readily added, provisioned or commissioned to facilitate increased traffic and more servers may be readily removed to facilitate decreased traffic. The integration of multiple blade servers within a single enclosure may more readily facilitate the implantation of fault tolerance and redundancy. Accordingly, the redundancy may ultimately result in substantial reliability and significantly reduced downtime.

In accordance with another aspect of the invention, at least a portion of the blade servers 120 may include one or more of the characteristics as set forth below. The blade server 120 may be modular and self-contained, and may include, for example, a server on a card or a single-board computer (SBC). The blade server 120 may include for example, a computer disposed in an ultra-dense card or board. The ultra-dense card may include, but is not limited to, a central processing unit (CPU), a memory, a hard disk and networking components. The blade server 120 may be hot swappable, hot pluggable and/or adapted for plug-and-play capability. The chassis or enclosure 110 may provide sharing among the blade servers 120 for one or more of the following: power supplies, cooling fans and access to the network 170 or storage.

Aspects of the system for communicating information in a server platform may include at least one switch blade for receiving at least a first packet from a first of a plurality of blade servers at a first data rate. The switch blade may determine at least a second blade server that is to receive the first packet and in response, transfer the received first packet to at least the second blade server at a negotiated data rate. A determination may also be made by the switch blade as to whether data responsive to the first packet may be sent to a network. In this case, responsive data may be transferred by the switch blade to the network at a second data rate or at a negotiated data rate.

In accordance with the invention, a second packet comprising at least a portion of the first received packet may be transferred by the switch blade to the second blade server at a newly negotiated data rate. The newly negotiated data rate may be similar to previously negotiated data rates. Notwithstanding, at least a portion of the first received packet may be transferred by the switch blade to at least the second blade server via a common bus.

The switch blade may also receive a third packet from a network at a second data rate. Accordingly, the switch blade may determine at least a third blade server that is to receive the third packet. Data responsive to the third packet and/or at least a portion of the third packet may be transferred by the switch blade to the third blade server at a negotiated data rate that may be similar to previously negotiated data rates. The switch blade may also transfer a fourth packet over the network via a network interface at the second data rate. In another aspect of the invention, a plurality of packets may be broadcasted by the switch blade over the network at the second data rate. Additionally, the switch blade may also broadcast the first packet to at least the first blade server and the second blade server at a negotiated data rate that may be similar to any previously negotiated data rates.

In an illustrative embodiment of the invention, referring to FIG. 1, the system for communicating information in a server platform may include at least one switch blade 140 for receiving at least a first packet from a first of a plurality of blade servers, for example blade server No. 1, at a first data rate. The switch blade 140 may determine at least a second blade server, for example blade server No. 2, that is to receive the first packet and in response, transfer the received first packet to at least the second blade server, for example blade server No. 2, at a negotiated data rate. The negotiated data rate may be a previously negotiated data rate. The switch blade 140 may also determine whether data responsive to the first packet may be sent to a network 170. In this case, the switch blade 140 may transfer responsive data to the network 170 at the second data rate or a negotiated data rate.

A second packet comprising at least a portion of the first received packet may be transferred by the switch blade 140 to the second blade server, for example blade server No. 2, at a newly negotiated data rate. In this regard, at least a portion of the first received packet may be transferred by the switch blade 140 to at least the second blade server, for example blade server No. 2, via a common bus. The switch blade 140 may also receive a third packet from a network 170 at a second data rate. Accordingly, the switch blade 140 may determine at least a third blade server, for example blade server No. n, that is to receive the third packet. Data responsive to the third packet and/or at least a portion of the third packet may be transferred by the switch blade 140 to the third blade server, for example blade server No. n, at a newly negotiated data rate or a previously negotiated data rate. The switch blade 140 may also transfer a fourth packet over the network 170 at the second data rate. In another aspect of the invention, a plurality of packets may be broadcasted by the switch blade 140 over the network 170 at the second data rate. Additionally, the switch blade 140 may broadcast the first packet to at least the first blade server, for example blade server No. 1, and the second blade server, for example blade server No. 2, at a newly negotiated data rate or a previously negotiated data rate.

Accordingly, the present invention may be realized in hardware, software, or a combination of hardware and software. The present invention may be realized in a centralized fashion in one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for communicating information in a server platform, the method comprising:
   receiving at least a first packet from a first blade server of a plurality of blade servers at a first data rate;
   determining whether one or both of at least a second blade server of said plurality of blade servers and a network is to receive said at least said first packet;
   negotiating a data rate for transfer of data between said first blade server and at least said second blade server; and
   transferring data responsive to said received at least said first packet to one or both of said determined at least said second blade server at said negotiated data rate, and said determined network at one of a second data rate or said negotiated data rate.

2. The method according to claim 1, comprising transferring at least a second packet comprising at least a portion of said at least said first received packet to said second blade server at said negotiated data rate.

3. The method according to claim 1, comprising transferring said at least a portion of said at least said first received packet to said at least said second blade server via a common bus.

4. The method according to claim 1, comprising receiving at least a third packet from said network at said second data rate.

5. The method according to claim 4, comprising determining at least a third blade server that is to receive said at least said third packet.

6. The method according to claim 5, comprising transferring data responsive to said third packet to said third blade server at a newly negotiated data rate.

7. The method according to claim 5, comprising transferring at least a portion of said at least said third packet to said third blade server at a newly negotiated data rate.

8. The method according to claim 1, comprising transferring a fourth packet to said network via a network interface at said second data rate.

9. The method according to claim 1, comprising broadcasting a plurality of packets over said network at said second data rate.

10. The method according to claim 1, comprising broadcasting said at least said first packet to said first blade server and said second blade server at a newly negotiated data rate.

11. A machine-readable storage having stored thereon, a computer program having at least one code section for communicating information in a server platform, the at least one code section being executable by a machine for causing the machine to perform steps comprising:
    receiving at least a first packet from a first blade server of a plurality of blade servers at a first data rate;
    determining whether one or both of at least a second blade server of said plurality of blade servers and a network is to receive said at least said first packet;
    negotiating a data rate for transfer of data between said first blade server and at least said second blade server; and
    transferring data responsive to said received at least said first packet to one or both of said determined at least said second blade server at said negotiated data rate, and said determined network at one of a second data rate or said negotiated data rate.

12. The machine-readable storage according to claim 11, comprising code for transferring at least a second packet comprising at least a portion of said at least said first received packet to said second blade server at said negotiated data rate.

13. The machine-readable storage according to claim 11, comprising code for transferring said at least a portion of said at least said first received packet to said at least said second blade server via a common bus.

14. The machine-readable storage according to claim 11, comprising code for receiving at least a third packet from said network at said second data rate.

15. The machine-readable storage according to claim 14, comprising code for determining at least a third blade server that is to receive said at least said third packet.

16. The machine-readable storage according to claim 15, comprising code for transferring data responsive to said third packet to said third blade server at a newly negotiated data rate.

17. The machine-readable storage according to claim 15, comprising code for transferring at least a portion of said at least said third packet to said third blade server at a newly negotiated data rate.

18. The machine-readable storage according to claim 11, comprising code for transferring a fourth packet to said network via a network interface at said second data rate.

19. The machine-readable storage according to claim 11, comprising code for broadcasting a plurality of packets over said network at said second data rate.

20. The machine-readable storage according to claim 11, comprising code for broadcasting said at least said first packet to said first blade server and said second blade server at a newly negotiated data rate.

21. A system for communicating information in a server platform, the system comprising:
   at least one switch blade that receives at least a first packet from a first blade server of a plurality of blade servers at a first data rate;
   said at least one switch blade determines whether one or both of at least a second blade server of said plurality of blade servers and a network is to receive said at least said first packet;
   said at least one switch blade negotiates a data rate for transfer of data between said first blade server and at least said second blade server; and
   said at least one switch blade transfers data responsive to said received at least said first packet to one or both of said determined at least said second blade server at said negotiated data rate, and said determined network at one of a second data rate or said negotiated data rate.

22. The system according to claim 21, wherein said at least one switch blade transfers at least a second packet comprising at least a portion of said at least said first received packet to said second blade server at said negotiated data rate.

23. The system according to claim 21, wherein said at least one switch blade transfers said at least a portion of said at least said first received packet to said at least said second blade server via a common bus.

24. The system according to claim 21, wherein said at least one switch blade receives at least a third packet from said network at said second data rate.

25. The system according to claim 24 wherein said at least one switch blade determines at least a third blade server that is to receive said at least said third packet.

26. The system according to claim 25, wherein said at least one switch blade transfers data responsive to said third packet to said third blade server at a newly negotiated data rate.

27. The system according to claim 25, wherein said at least one switch blade transfers at least a portion of said at least said third packet to said third blade server at a newly negotiated data rate.

28. The system according to claim 21, wherein said at least one switch blade transfers a fourth packet to said network via a network interface at said second data rate.

29. The system according to claim 21, wherein said at least one switch blade broadcasts a plurality of packets over said network at said second data rate.

30. The system according to claim 21, wherein said at least one switch blade broadcasts said at least said first packet to said first blade server and said second blade server at a newly negotiated data rate.

* * * * *